United States Patent [19]

Fisher et al.

[11] 4,268,914

[45] May 19, 1981

[54] RECEIVING APPARATUS FOR MESSAGES WITH IN-BAND SIGNALS

[76] Inventors: Charles B. Fisher, 2850 Hill Park Rd., Montreal, Quebec, Canada, H3H 1T1; Sidney T. Fisher, 53 Morrison Ave., Mt. Royal, Montreal, Quebec, Canada, H3R 1K3

[21] Appl. No.: 119,768

[22] Filed: Feb. 8, 1980

[51] Int. Cl.³ .............................................. H04J 15/00
[52] U.S. Cl. .................................... 370/118; 370/119
[58] Field of Search ................... 370/119, 118, 19, 18; 179/1 GS, 1 GB

[56] References Cited

U.S. PATENT DOCUMENTS 4,178,553  12/1979  Fisher et al. ......................... 325/487
4,182,932   1/1980  Fisher et al. ...................... 179/1 GS

OTHER PUBLICATIONS

*Reference Data for Radio Engineers*, New York, 1969, pp. 21-13 & 21-14.
Stephen Prigozy, "Zero-Crossing Detector Provides Fast Sync Pulses", *Electronics*, Apr. 19, 1965, p. 91.
Philip Panter, *Modulation, Noise, and Spectral Analysis*, McGraw-Hill, 1965, pp. 506 to 547.
T. R. Ferrara, "Delayed Output Pulse Generator", *EEE* 13:10, p. 71, summarized in Marcus, *Sourcebook of Electronic Circuits*, New York, 1968, p. 529.

*Primary Examiner*—Douglas W. Olms

[57] ABSTRACT

Receiving apparatus for a message occupying a message frequency band which simultaneously may include noise, and includes one or more unmodulated or amplitude-modulated double-sideband constant-frequency carriers with or without carrier suppression as periodic signals, which uses sampling and reconstruction circuits to deliver the message substantially free from the periodic signals, and to deliver each periodic signal substantially free from noise, the message and any other periodic signal present in the message frequency band.

1 Claim, 2 Drawing Figures

RECEIVING APPARATUS FOR MESSAGES WITH IN-BAND SIGNALS

BACKGROUND OF THE INVENTION

This invention relates to receiving apparatus for a message with one or more periodic signals simultaneously present in the message frequency band.

In the prior art an in-band signal is usually present in a message frequency band only when a message is not being received. If a periodic signal is to be received simultaneously with a message, the periodic signal is usually either transmitted outside the message frequency band, or at a low level which does not materially degrade the message quality, or by angle modulation of a carrier which is amplitude-modulated by the message. Each of these methods has unsatisfactory features in service. We do not know of any prior art relevant to this invention.

BRIEF DESCRIPTION OF THE INVENTION

Receiving apparatus is disclosed which receives a message which is a continuous band-limited function occupying a message frequency band which may contain superimposed noise and contains one or more periodic signals which are constant-frequency sine waves with or without double-sideband amplitude modulation, and if modulated, with or without carrier suppression. The receiving apparatus delivers the message without material distortion of frequency response or delay, substantially free from the periodic signal or signals, and delivers each periodic signal substantially free from the message, noise and any other periodic signal.

The periodic signal of lowest frequency has a frequency of zero-crossings greater than the minimum sampling or Nyquist frequency, well-known in sampling theory, for the message frequency band. No generality is lost by this requirement, as methods are well known to shift the waves occupying the message frequency band to a position in the spectrum where the required condition is met, and after separation of the waves in the shifted message frequency band to return them to the original message frequency band.

A received wave comprising a message which is a continuous band-limited function, superimposed noise, and a periodic signal which has a frequency of zero-crossings greater than the minimum sampling or Nyquist frequency for the message frequency band, all in the message frequency band, is passed through a monopolar sampling gate, which is opened by a sequence of short gating pulses derived from the received wave by well-known selective, limiting and other means. The gating pulse frequency is greater than the minimum sampling or Nyquist frequency for the message frequency band and the pulses all occur at regular intervals at some or all of the instants of zero-crossings of the periodic signal at the input to the sampling gate. Thus the resultant sequency of short samples at the gate output, by well-known sampling theory, fully defines the message and superimposed noise present at the gate input. It has no components due to the periodic signal. The sequence of samples from the gate is reconstructed, by well-known theory, in a reconstruction filter which has a pass-band equal to the message frequency band and delivers a replica of the message plus superimposed noise, substantially free from the periodic signal and substantially unaltered except for an amplitude factor which may be corrected by an amplifier and frequency distortion and delay distortion due to the filter.

The received wave is also passed without sampling through a frequency and delay adjusting circuit which may be identical to the reconstruction filter which follows the sampling gate, or by other means, to a substraction circuit. The output of one filter may be substracted in the substraction circuit from the output of the other filter, and the resultant is seen to be equal to the periodic signal substantially free from the message and from the noise.

DETAILED DESCRIPTION OF THE INVENTION

This invention is based on sampling theory as follows:

(1) When a continuous band-limited function occupying a message frequency band extending from nB to (n+1)B is sampled for short periods at a frequency greater than the minimum sampling or Nyquist frequency for the message frequency band, the Nyquist frequency being a function of n and B with discontinuous derivatives, varying between B and 4B, the resultant sequence of samples fully defines the continuous band-limited function in the message frequency band. A well-known theorem gives the range of the Nyquist function as 2B to 4B, and an extension in U.S. Pat. No. 4,178,553, Fisher et al, extends the range to B for messages which are double-sideband amplitude-modulated waves.

(2) When the sequence of samples of paragraph (1) above is passed through a filter with a pass-band equal to the message frequency band containing the continuous band-limited function, a replica of the continuous band-limited function is reconstructed, differing from the original only by an amplitude factor and by the delay and frequency distortion of the filter. The replica is independent of the actual instants of sampling, as long as these occur regularly with greater than the minimum or Nyquist frequency. This is also a well-known theorem.

(3) We have discovered an exception to the theorems of paragraphs (1) and (2) above and this exception provides the theoretical basis of this invention. If the message frequency band nB to (n+1)B contains a periodic signal which has regularly-occurring zero-crossings at a frequency greater than the minimum sampling or Nyquist frequency for the message frequency band, and all instants of sampling occur at regular intervals at instants of some or all of the zero-crossings of the periodic signal, then the resultant sequence of samples contains no components from the periodic signal and the output of the reconstruction filter does not contain a replica of the periodic signal. The truth of this theorem is self-evident, as all samples have been taken at instants at which the periodic signal has zero amplitude. The theorem is substantially true even when the sampling period is an appreciable portion of the period of the periodic signal, as long as the sampling periods are substantially centered on instants of zero-crossings of the periodic signal. Thus we have discovered means for separating a given periodic signal from other waves occupying the same frequency band. This means is used in this invention to deliver the given periodic signal substantially free from the other waves, and the other waves substantially free from the periodic signal.

(4) It is also well known that a constant-frequency sine wave has zero-crossings at regularly-occurring intervals, and that when such a wave is double-sideband amplitude-modulated the modulated wave has zero-crossings of the unmodulated carrier, whether or not the carrier is suppressed in the modulation process.

Figure 1:
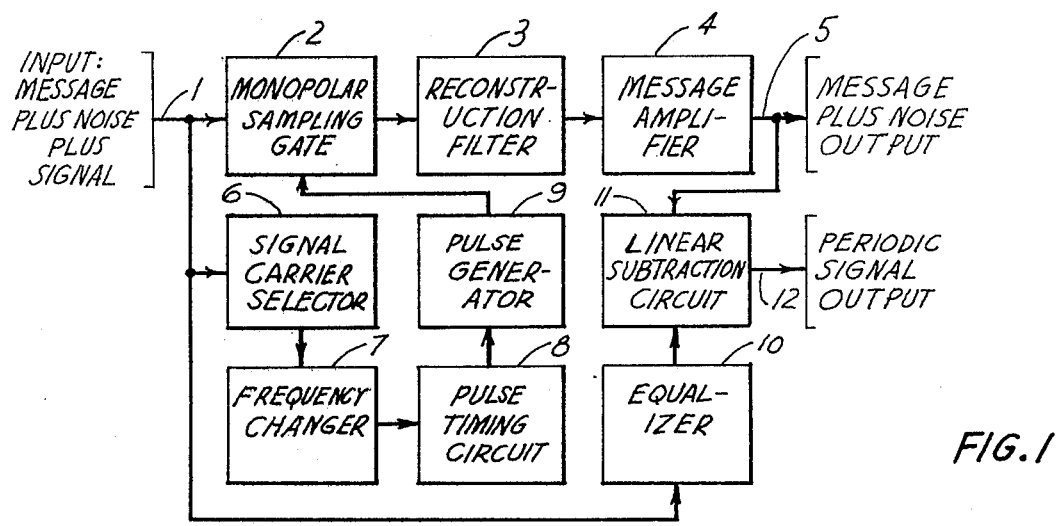
FIG. 1 shows in simplified block schematic form a receiving apparatus in accordance with the invention, which delivers the sampled and reconstructed message plus the superimposed noise substantially free from the periodic signal to the message output, and the periodic signal substantially free from the message and from the superimposed noise to the periodic signal output, using a linear substraction circuit.

In FIG. 1 an input wave comprising a message plus superimposed noise plus a periodic signal, all lying in the message frequency band, with the frequency of regularly-occurring zero-crossings of the periodic signal greater than the minimum sampling or Nyquist frequency of the message frequency band, is received on lead 1 and delivered to monopolar sampling gate 2. This gate is equivalent to an on-off switch and is well known in the prior art.

The sequence of samples of the input wave is delivered from sampling gate 2 to message reconstruction filter 3, which is a band-pass filter with the pass-band of the message frequency band. Filter 3 reconstructs the sequence of samples, produced by gating pulses in sampling gate 2 at instants of zero-crossings of the periodic signal, in analog form as a replica of the message and superimposed noise on lead 1, unaltered except for delay and frequency distortion caused by the pass-band of filter 3, substantially free from the periodic signal, and delivers its output to message amplifier 4, which delivers the message over lead 5 to the message output circuit.

The input wave on lead 1 is also delivered to periodic signal carrier selector 6, which uses one or more of the well-known means of selectivity, amplitude limiting, non-linearity and oscillator synchronization to deliver a wave, with a frequency, if unmodulated or carrier frequency, if modulated, of the periodic signal, to frequency changer 7. Frequency changer 7 is a well-known device, which receives a sine wave and delivers a sine wave with a frequency related by the ratio of two positive integers to the frequency of its input wave, with a fixed timing relationship between the two waves. The output of frequency changer 7 is used in pulse timing circuit 8 and pulse generator 9 to deliver a sequence of short regularly-occurring gating pulses to monopolar sampling gate 2, with a pulse repetition frequency greater than the minimum sampling or Nyquist frequency for the message frequency band, all gating pulses occurring at instants of zero-crossings of the periodic signal on lead 1. Pulse timing circuit 8 may be a phase shifting circuit preceding, or a pulse delay circuit following, pulse generator 9. Pulse generator 9, for reasons of accuracy, preferably generates a short pulse at the instant of each zero-crossing of its input wave, but another of a number of well-known types may be used. Suitable phase shifting and pulse timing circuits are well known in the prior art.

The input wave on lead 1 is also passed through equalizer 10 which has frequency response and delay characteristics identical to those of message reconstruction filter 3 plus message amplifier 4. Then by correct choice of the gain of amplifier 4 the message and noise at the outputs of amplifier 4 and filter 10 can be made substantially identical in amplitude at every instant. The output of amplifier 4 is led to a first input of linear subtraction circuit 11 and the output of equalizer 10 is led to a second input of linear subtraction circuit 11. Linear subtraction circuit 11 may be a simple resistive network or a 3-winding transformer, which delivers over periodic signal output lead 12 the resultant of the subtraction of the wave at the first input from the wave at the second input of circuit 11. In this case the resultant is seen to be the periodic signal substantially free from the message and superimposed noise.

Figure 2:
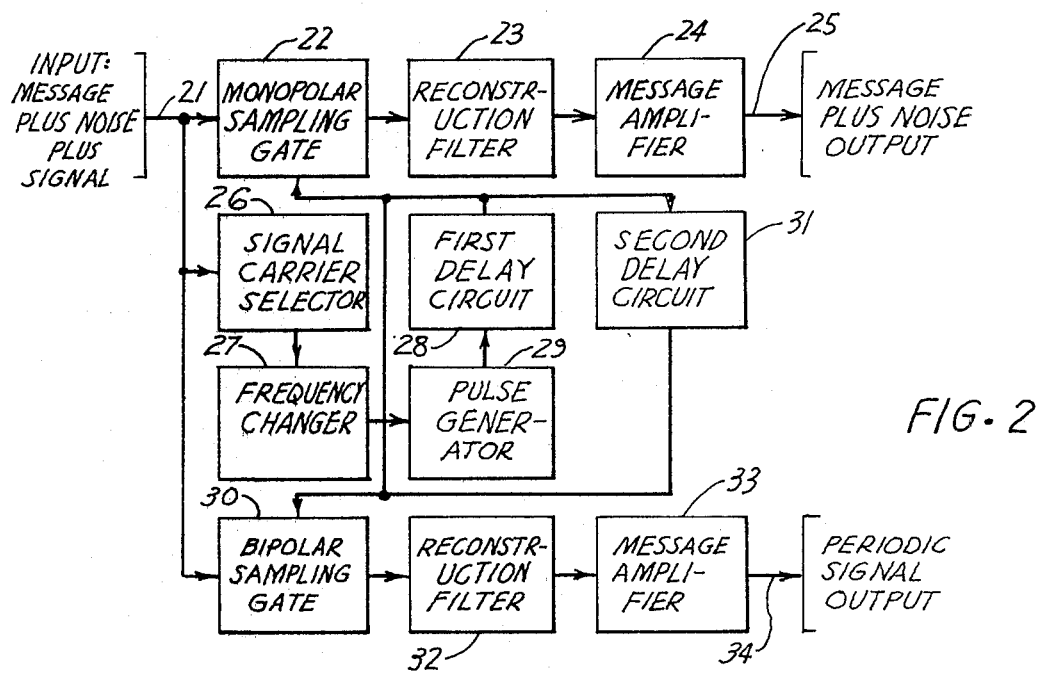
FIG. 2 shows in simplified block schematic form a receiving apparatus in accordance with the invention in which the input wave is sampled and reconstructed to deliver the message plus the superimposed noise substantially free from the periodic signal at the message output, and the input wave is also sampled in a bipolar gate by two sequences of pulses of opposite polarity, spaced approximately an odd number of quarters of the periodic signal period apart, each with the same frequency, greater than the minimum sampling or Nyquist frequency for the message band and equal to the frequency of zero-crossings of the periodic signal divided by an odd integer, and reconstructed in a filter passing the periodic signal frequency band, which delivers the periodic signal substantially free from the message and superimposed noise to the periodic signal output.

In FIG. 2 an input wave comprising a message plus superimposed noise plus a periodic signal, all lying in the message frequency band, with the frequency of regularly-occurring zero-crossings of the periodic signal greater than the minimum sampling or Nyquist frequency for the message frequency band, is received on lead 21 and delivered to monopolar sampling gate 22. This gate is equivalent to an on-off switch and is well known in the prior art.

The sequence of samples of the input wave is delivered from sampling gate 22 to first reconstruction filter 23, which is a band-pass filter with a pass-band of the message frequency band. Filter 23 reconstructs the sequence of samples produced by gating pulses in sampling gate 22 at instants of some or all of the zero-crossings of the periodic signal on lead 21, and delivers it substantially free from the periodic signal in analog form as a replica of the message and superimposed noise on lead 21, unaltered except for an amplitude factor and for delay and frequency distortion caused by message reconstruction filter 23, to amplifier 24, which delivers it over lad 25 to the message output.

The periodic signal on lead 21 is also delivered to periodic signal carrier selector 26, which uses one or more of the well-known means of selectivity, amplitude limiting, non-linearity and oscillator synchronization to deliver a wave with frequency equal to the frequency or carrier frequency of the periodic signal, to frequency changer 27. Frequency changer 27 is a well-known device which receives a sine wave and delivers a sine wave with a frequency related by the ratio of two positive integers to the frequency of its input wave, with a fixed timing relationship between the two waves. The output of frequency changer 27 is used in pulse generator 29 to produce a sequence of short pulses with a repetition frequency greater than the minimum sampling or Nyquist frequency for the message frequency band, equal to the frequency of zero-crossings of the periodic signal divided by a positive odd integer, so that when delayed in first pulse delay circuit 28, well known in the prior art, which delivers a sequence of short regularly-occurring gating pulses to gate 22, all gating pulses occur at instants of some or all of the zero-crossings of the periodic signal on lead 21. Pulse generator 29 for reasons of accuracy preferably generates a short pulse at the instant of each zero-crossing of its input wave, but one of a number of other well-known types may be used.

The input wave on lead 21 is also delivered to bipolar sampling gate 30. This is a well-known device which is in effect a subtraction circuit and is the equivalent of a switch normally open, which completes the circuit from gate input to output with one polarity when driven by a gating pulse of one polarity, and completes the circuit with the opposite polarity when driven by a gating pulse of a second polarity. This device is widely used in single-sideband multiplex modulators and demodulators, and often consists of four diodes in a lattice connection between two center-tapped transformers. A first sequence of pulses from first pulse delay circuit 28 of a first polarity is delivered as gating pulses to gate 30 at instants of some or all of the zero-crossings of the periodic signal on lead 21. This sequence of pulses produces a first sequence of samples of one polarity of the message plus the superimposed noise, a sequence which is reconstructed in second reconstruction filter 32 which may have a pass-band covering the periodic signal band on lead 21, to produce a replica of the portion of the message plus superimposed noise in the signal frequency band on lead 21, of a first polarity in analog form, substantially unaltered except for delay and frequency distortion caused by filter 32. Second message amplifier 33 amplifies the output of filter 32 and delivers it over lead 34 to the periodic signal output.

First pulse delay circuit 28 also delivers pulses to second pulse delay circuit 31, which may be similar to delay circuit 28, and delivers pulses of the same duration to gate 30, except that they have a delay approximately equal to an odd number of quarter periods of the periodic signal on lead 21, and are equal in duration but reversed in polarity from the pulses from circuit 28. If delay circuit 28 is assumed disconnected from gate 30, then gate 30 will receive gating pulses from delay circuit 31 with the same frequency as received previously from delay circuit 28, but reversed in polarity and occuring near peaks of the periodic signal, which are seen to be alternately of positive and negative polarity, due to the particular frequency chosen for the output of pulse generator 29. The output of gate 30 consists of a sequence of samples of the input wave which is delivered to second reconstruction filter 32. This reconstructs the sequence of samples produced by gating pulses in bipolar sampling gate 30 at instants of alternate positive and negative peaks of the periodic signal and delivers it in analog form, reversed in polarity due to the reversed polarity of pulses from delay circuits 28 and 31, substantially as a replica of the periodic signal on lead 21, unaltered except for polarity and delay and distortion caused by filter 32.

The principle of superposition applies to reconstruction of sampled waves by a filter. As described above the output of filter 32 consists of a first replica of a portion of the message plus superimposed noise in the signal frequency band on lead 21 of a first polarity, and a second replica of the portion of the message plus the superimposed noise plus the periodic signal in the signal frequency band on lead 21, reversed in polarity, both substantially unaltered except for delay and frequency distortion caused by filter 32. It is clear that the net resultant output of filter 32 as amplified on lead 34 is therefore the periodic signal substantially free from the message and from noise.

This invention includes obvious variations of the disclosure, such as: placing the message amplifiers before instead of after the reconstruction filters; using a phase shifting circuit in place of pulse timing circuit 8; using a phase shifting circuit between frequency changer 27 and pulse generator 29 and omitting signal zero-crossing delay circuit 28; using two oppositely poled monopolar gates in place of bipolar gate 30; using a frequency and delay equalizer in place of second reconstruction filter 10, using a phase shifter and a second pulse generator in place of signal peak delay circuit 31, and using a filter passing the message signal frequency band in place of second reconstruction filter 32.

It is also clear that if two or more messages are present in the input wave, occupying different frequency bands, then the message frequency band includes the frequency bands of all messages. If more than one periodic signal is present, the message channels of FIGS. 1 and 2 must include an additional monopolar sampling gate, carrier selector, frequency changer, pulse timing circuit and pulse generator for each additional periodic signal. FIG. 2 must include an additional bipolar gate, second message amplifier, second reconstruction filter, signal zero-crossing delay circuit and signal peak delay circuit for each additional periodic signal.

We claim:

1. Receiving apparatus for an input wave comprising a message, superimposed noise, and a periodic signal with regularly-occurring zero-crossings at a frequency greater than the minimum sampling or Nyquist frequency of the frequency band of said message, said input wave lying entirely in said message frequency band, including sampling gate, reconstruction filter, pulse generation and subtraction means, delivering said message and said superimposed noise substantially free from said periodic signal to a message output and delivering said periodic signal substantially free from said message and said superimposed noise to a periodic signal output, without material distortion of frequency response or delay of said message, which comprises:

monopolar sampling gate means which receives said input wave, and first reconstruction filter means which receives the output of said monopolar sampling gate means and has as a pass-band said message frequency band, and reconstructs a replica in analog form of said message and said superimposed noise substantially free from said periodic signal, and first amplifier means which amplifies the output of said first reconstruction filter means and delivers it to said message output, and periodic signal carrier selector means which receives said input wave and by at least one means of selectivity, amplitude limiting, non-linear and oscillator synchronizing means produces an output which has the frequency of said periodic signal, which may be the carrier of said periodic signal when it is double-sideband amplitude-modulated, with or without carrier suppression, and frequency changing and pulse generating means which receive the output of said periodic carrier selector means and produce a sequence of regularly-occurring short pulses at a pulse repetition frequency which is greater than the minimum sampling or Nyquist frequency of said message frequency band, and which is equal to the frequency of zero-crossings of said periodic signal at the input to said periodic carrier selector, divided by a positive odd integer, and first pulse delay means which receives the output of said pulse generating means and delivers gating pulses of a first polarity at regular periods at some or all of the instants of zero-crossings of said periodic signal at said input to said periodic carrier selector, and subtraction means which comprises a bipolar sampling gate which receives as one sequence of gating pulses the output of said first pulse delay means, and receives as a second sequence of gating pulses of a second polarity, spaced in time from said first sequence of gating pulses by approximately an odd number of quarter periods of said periodic signal, the output of a second pulse delay means, and said second pulse delay means which receives its input from said first pulse delay means and delivers a sequence of pulses of opposite polarity to said pulses at its input, delayed in time by an interval approximately equal to an odd number of quarter-periods of said periodic signal, and second reconstruction filter means which receives the output of said bipolar sampling gate means, which passes said periodic signal frequency band and reconstructs the two sequences of samples from said bipolar sampling gate to form said periodic signal in analog form, and delivers said periodic signal to an output circuit, substantially free from said message and said superimposed noise.

* * * * *

UNITED STATES PATENT AND TRADEMARK OFFICE
CERTIFICATE OF CORRECTION

PATENT NO. : 4,268,914
DATED : May 19, 1981
INVENTOR(S) : Charles B. Fisher and Sidney T. Fisher It is certified that error appears in the above—identified patent and that said Letters Patent is hereby corrected as shown below:

Column 1, line 59, "...sequency..."

should read "...sequence...".

Column 4, line 48, "...lad..."

should read "...lead...".

Signed and Sealed this

Fourth Day of August 1981

[SEAL]

Attest:

GERALD J. MOSSINGHOFF

Attesting Officer

Commissioner of Patents and Trademarks